(12) United States Patent
Otani et al.

(10) Patent No.: US 9,263,188 B2
(45) Date of Patent: Feb. 16, 2016

(54) CONDUCTIVE RESIN COMPOSITION AND CHIP-TYPE ELECTRONIC COMPONENT

(75) Inventors: Shinji Otani, Amagasaki (JP); Akihiro Nomura, Moriyama (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 884 days.

(21) Appl. No.: 12/951,403

(22) Filed: Nov. 22, 2010

(65) Prior Publication Data

US 2011/0132637 A1  Jun. 9, 2011

(30) Foreign Application Priority Data

Dec. 4, 2009  (JP) ................................ 2009-276057
Mar. 9, 2010  (JP) ................................ 2010-052124

(51) Int. Cl.
| | | |
|---|---|---|
| *C08L 63/00* | (2006.01) | |
| *H01G 4/008* | (2006.01) | |
| *H01B 1/22* | (2006.01) | |
| *H01G 4/30* | (2006.01) | |

(52) U.S. Cl.
CPC ................ *H01G 4/008* (2013.01); *C08L 63/00* (2013.01); *H01B 1/22* (2013.01); *H01G 4/30* (2013.01)

(58) Field of Classification Search
CPC ............................... C09D 163/00; C08L 63/00
USPC ......................................................... 523/458
See application file for complete search history.

(56) References Cited

U.S. PATENT DOCUMENTS

| | | | | |
|---|---|---|---|---|
| 5,202,153 A | * | 4/1993 | Siuta ............................. | 427/125 |
| 5,969,048 A | * | 10/1999 | Ito et al. ....................... | 525/186 |
| 2002/0037436 A1 | * | 3/2002 | Ejiri et al. ............... | 428/694 BS |
| 2003/0036587 A1 | * | 2/2003 | Kozak ........................... | 523/445 |
| 2003/0113585 A1 | * | 6/2003 | Mori et al. ............... | 428/694 BH |
| 2005/0194577 A1 | * | 9/2005 | Kasuga et al. ............... | 252/514 |
| 2006/0220500 A1 | * | 10/2006 | Shimada et al. ............ | 310/348 |
| 2007/0164260 A1 | | 7/2007 | Kuwajima | |

(Continued)

FOREIGN PATENT DOCUMENTS

| | | |
|---|---|---|
| JP | 03-363369 A | 8/1999 |
| JP | 11219849 * | 8/1999 |

(Continued)

OTHER PUBLICATIONS

English language machine translation of JP 2005/183301. Printed May 2, 2013. Original Japanese document published Jul. 2005.*

(Continued)

*Primary Examiner* — Megan McCulley
(74) *Attorney, Agent, or Firm* — Arent Fox LLP

(57) ABSTRACT

A conductive resin composition which allows a resin electrode which is favorable in terms of shape and adhesion to a ceramic device to be formed reliably, and a chip-type electronic component including resin electrodes formed with the conductive resin component are described. The conductive resin composition contains a linear bifunctional epoxy resin having a molecular weight of 11000 to 40000 and a terminal glycidyl group, a conductive silver powder, and a solvent, and has a yield value of 3.6 Pa or less. In addition, the conductive powder can have a surface attached to a fatty acid or a salt thereof, and the ratio of the fatty acid or salt thereof to the conductive powder is 0.5 wt % or less. Furthermore, the conductive powder can be spherical, and the ratio of the conductive powder in solids constituting the conductive resin composition can be 42 to 54 vol %.

20 Claims, 2 Drawing Sheets

(56) References Cited

U.S. PATENT DOCUMENTS

| | | | |
|---|---|---|---|
| 2007/0215379 A1 | 9/2007 | Komatsu et al. | |
| 2008/0083909 A1* | 4/2008 | Sato et al. | 252/512 |
| 2010/0155653 A1 | 6/2010 | Nakayoshi et al. | |
| 2010/0302714 A1* | 12/2010 | Kobayakawa et al. | 361/529 |
| 2011/0102231 A1* | 5/2011 | Matsumoto et al. | 342/1 |
| 2012/0237465 A1* | 9/2012 | Tamareselvy et al. | 424/59 |
| 2012/0305302 A1* | 12/2012 | Mizokami | 174/259 |
| 2012/0316308 A1* | 12/2012 | Tamareselvy et al. | 526/312 |

FOREIGN PATENT DOCUMENTS

| | | | |
|---|---|---|---|
| JP | 2004-176165 A | | 6/2004 |
| JP | 2005-183301 A | | 7/2005 |
| JP | 2005-264095 A | | 9/2005 |
| JP | 2007-067239 A | | 3/2007 |
| JP | 2007-234800 A | | 9/2007 |
| JP | 2007234800 A | * | 9/2007 |
| JP | 2007-265802 A | | 10/2007 |
| WO | WO 2004/050753 | * | 6/2004 |

OTHER PUBLICATIONS

Vesna V. Vukovic and Jovan M. Nedeljkovic, "Surface Modification of Nanometer-Scale Silver Particles by Imidazole", Dec. 1993, Langmuir 1993, 9, 980-983.*

Japanese Office Action issued for corresponding JP 2010-052124, dispatch date Oct. 30, 2012 (with English translation).

Database WPI, Week 200573, Thomson Scientific, London GB; JP 2005 264095 Sep. 29, 2005(abstract).

Database WPI, Week 200843, Thomson Scientific, London GB; JP 2007 265802 A Oct. 11, 2007(abstract).

* cited by examiner

PRIOR ART

CONDUCTIVE RESIN COMPOSITION AND CHIP-TYPE ELECTRONIC COMPONENT

BACKGROUND OF THE INVENTION

1. Field of the Invention

The present invention related to a conductive resin composition and a chip-type electronic component, and more particularly, relates to a conductive resin composition suitable for use in the formation of a resin electrode to serve as an external electrode of a chip-type electronic component, and a chip-type electronic component including a resin electrode (an external electrode) formed from the same.

2. Description of the Related Art

In recent years, resin electrodes formed by applying and curing a resin composition containing a conductive component have been used as external electrodes in chip-type electronic components such as chip-type laminated ceramic capacitors.

As one of such chip-type electronic components, a chip-type capacitor has been proposed which has a structure as shown in FIG. 2 (see Japanese Patent Application Laid-Open (JP-A) No. 2007-67239).

This chip-type capacitor includes a laminated ceramic device (chip substrate) 51 including ceramic layers 52 and internal electrodes 53a and 53b, end surface electrodes (fired electrodes) 55a and 55b formed by applying a conductive paste to both end surfaces 54a and 54b of the laminated ceramic device 51 and firing the conductive paste, and resin electrodes 56a and 56b provided so as to cover the end surface electrodes 55a and 55b.

It is to be noted that the end surface electrodes 55a and 55b and the resin electrodes 56a and 56b constitute external electrodes electrically connected to the internal electrodes 53a and 53b in this chip-type capacitor.

In addition, when the outermost ceramic layer 52a of the laminated ceramic device (chip substrate) 51 in this chip-type capacitor has a thickness L, the end surface electrodes 55a and 55b are adapted to cover the surface of the outermost ceramic layer within L×tan θ (θ=30°), and the resin electrodes 56a and 56b are provided to cover the end surface electrodes 55a and 55b.

Furthermore, the resin electrodes 56a and 56b in this chip-type capacitor covering the end surface electrodes 55a and 55b have flexibility, and thus the resin electrodes 56a and 56b have sufficient adhesion to the laminated ceramic device (chip substrate) 51 and the end surface electrodes 55a and 55b, not to be detached by stress. In addition, the resin electrodes 56a and 56b function to prevent the occurrence of cracks starting from the ends of the end surface electrodes 55a and 55b which are fired electrodes, and even if any cracks occur, the resin electrodes 56a and 56b are considered to be able to prevent the internal electrodes 53a and 53b from being broken by the cracks, because the areas for the end surface electrodes 55a and 55b provided are as described above.

As a conductive resin composition used for the formation of the resin electrodes 53a and 53b, a conductive resin composition containing a metal powder, an epoxy resin, a curing agent, and a solvent has been proposed which has a thixotropic index of 1.8 or less, where the index is the viscosity measured at the number of revolutions of 1 rpm in a rotating viscometer is divided by the viscosity measured at the number of revolutions of 5 rpm (see claim 1 of JP-A No. 2005-264095).

A conductive resin composition has been proposed in which the epoxy resin is a mixture containing an epoxy resin component (A) with an epoxy equivalent of 900 g/eq or more and an epoxy resin component (B) with an epoxy equivalent less than 900 g/eq, and the content of the epoxy resin component (A) in the epoxy resin is 30 wt % or more (see claim 2 of JP-A No. 2005-264095).

In the case of the conductive resin composition in JP-A No. 2005-264095, the thixotropic index set to 1.8 or less is considered to make the applied shape favorable.

In addition, the epoxy equivalents specified as described above are considered to provide a conductive resin composition in which the thixotropic index is 1.8 or less.

SUMMARY OF THE INVENTION

When the laminated ceramic device in the case of the chip-type capacitor in JP-A No. 2007-67239 is to be immersed in a conductive resin composition for the formation of the resin electrode to thereby apply the conductive resin composition onto the end surface electrodes of the laminated ceramic device, the inadequate rheology of the conductive resin composition tends to result in deterioration of the applied shape, and make the shape of the resin electrode into a mountain-like shape with a raised central section (a region corresponding to a central region of the end surface of the laminated ceramic device), and thus presents a problem of adversely affecting on the plating capability in a subsequent plating step and on the mounting capability in a mounting step.

In addition, while the thixotropic index in the case of the conductive resin composition in JP-A No. 2005-264095 is specified as a factor influencing the shape, no particular solution has been actually proposed for the issue of the adhesion to a target subjected to the formation (for example, the laminated ceramic device), which is likely to be problematic in the case of forming resin electrodes.

While JP-A No. 2005-264095 specifies, as a factor, only the epoxy equivalent as a condition for obtaining a desired thixotropic index, the rheology actually differs depending on the surface condition and shape of a filler such as a conductive component. It is estimated that depending on the relationship with the filler, any favorable applied shape may not be able to be always obtained in some cases.

The present invention has been achieved in order to solve the problems described above, and an object of the present invention is to provide a conductive resin composition which allows a resin electrode which is favorable in terms of shape and favorable in terms of adhesion to a ceramic device to be formed reliably, and a chip-type electronic component including resin electrodes formed from the conductive resin composition.

In order to solve the problems, a conductive resin composition according to the present invention includes: a linear bifunctional epoxy resin having a molecular weight of 11000 to 40000 and having a glycidyl group at a molecular end; a conductive powder with a surface made of silver; and a solvent, wherein the yield value is 3.6 Pa or less.

In another embodiment, the conductive resin composition according to the present invention includes: a linear bifunctional epoxy resin having a molecular weight of 11000 to 40000 and having a glycidyl group at a molecular end; a conductive powder with a surface made of silver; and a solvent, wherein the conductive powder has a surface attached to a fatty acid or a salt thereof, and the ratio of the fatty acid or salt thereof to the conductive powder is 0.5 wt % or less.

In a further embodiment, the conductive resin composition according to the present invention includes: a linear bifunctional epoxy resin having a molecular weight of 11000 to 40000 and having a glycidyl group at a molecular end; a conductive powder with a surface made of silver; and a solvent, wherein the conductive powder has a surface coated with at least one of a triazole compound and an imidazole compound.

It is desirable to use 1-methylbenzotriazole as the triazole compound and to use 2-methylimidazole as the imidazole compound.

In addition, the conductive powder is desirably spherical, and the ratio of the conductive powder solids in the conductive resin composition is desirably 42 to 54 vol %.

In the conductive resin composition according to the present invention, it is desirable to use bisphenol A epoxy resin as the bifunctional epoxy resin.

In solvent is desirably a mixed solvent of two or more types of solvents, and the mixed solvent desirably contains a solvent with a vapor pressure ≥0.8 mmHg (25° C.) at a rate of 45 wt % or less.

A chip-type electronic component according to the present invention includes an electronic component device and an external electrode formed on the electronic component device, wherein the external electrode includes a resin electrode formed by applying, drying, and curing the conductive resin composition according to the present invention.

The conductive resin composition according to the present invention includes a linear bifunctional epoxy resin having a molecular weight of 11000 to 40000 and having a glycidyl group at the molecular end, a conductive powder with a surface made of silver, and a solvent, and has a yield value of 3.6 Pa or less. Thus, the conductive resin composition has a moderate fluidity, and allows a favorable shape to be obtained reliably when the conductive resin composition is applied to a target such as an electronic component device, and the use of the conductive resin composition according to the present invention allows resin electrodes with a high degree of shape accuracy and with excellent adhesion to electronic component devices and the like to be formed efficiently and even reliably.

Various types of conductive powder with a surface made of silver may be used as the conductive powder in the conductive resin composition according to the present invention, and as the conductive powder with a surface made of silver, copper powder, nickel powder, tin powder, aluminum powder, etc. with a surface coated with silver may be used, in addition to a powder entirely composed of silver.

The conductive resin composition according to the present invention can include a linear bifunctional epoxy resin having a molecular weight of 11000 to 40000 and having a glycidyl group at the molecular end, a conductive powder with a surface made of silver, and a solvent, with a fatty acid or a salt thereof attached to the conductive powder in an amount of 0.5 wt % or less with respect to the conductive powder. Thus, the conductive resin composition has a moderate fluidity, and allows a favorable applied shape to be obtained reliably when the conductive resin composition is applied to a target such as an electronic component device, and the use of the conductive resin composition according to the present invention allows resin electrodes with a high degree of shape accuracy and with excellent adhesion to electronic component devices and the like to be formed efficiently and even reliably.

In addition, when the conductive powder in the conductive resin composition has its surface coated with at least one of a triazole compound and an imidazole compound, the conductive resin composition allows resin electrodes which are favorable in terms of shape and excellent in terms of adhesion to be formed efficiently and reliably.

Furthermore, the triazole compound and the imidazole compound have high adsorption stability, and thus a conductive resin composition can be obtained which allows a favorable shape to be obtained without carrying out an aging treatment for promoting an adsorption reaction in the process of producing the conductive resin composition.

As used herein, a aging treatment refers to a treatment carried out in order to stabilize the adsorbed state between the less active Ag constituting the conductive powder and the epoxy resin, that is, a treatment carried out in order to promote adsorption by heating for a predetermined period of time to provide external energy.

In the case of the conductive resin composition formed with 1-methylbenzotriazole as the triazole compound or with 2-methylimidazole as the imidazole compound, the conductive resin composition has a low yield value and is stabilized at an early stage, thus allowing a favorable shape to be obtained, and allows excellent resin electrodes in terms of adhesion to be formed efficiently and reliably.

In the conductive resin composition according to the present invention, when a spherical conductive powder is used as the conductive powder, and when the ratio of the conductive powder solids constituting the conductive resin composition falls within a range of 42 to 54 vol %, the conductive resin composition has a moderate fluidity, and that allows resin electrodes with a high degree of shape accuracy and with extremely favorable adhesion and plating capability to be formed when the conductive resin composition is applied to a target such as an electronic component device, thereby making the present invention more effective.

Furthermore, the use of bisphenol A epoxy resin as the bifunctional epoxy resin allows the heat resistance to be improved.

When a mixed solvent of two or more types of solvents is used as the solvent, and when the mixed solvent is prepared so as to contain a solvent with a vapor pressure ≥0.8 mmHg (25° C.) at a rate of 45 wt % or less, resin electrodes with favorable properties can be formed while preventing the resin electrodes from having microcracks, even in the case of carrying out drying at a high rate of temperature increase after application.

In the chip-type electronic component according to the present invention including the electronic component device and the external electrode formed on the electronic component device, the external electrode includes a resin electrode with a favorable shape and with excellent adhesion to the electronic component device, which is formed with the conductive resin composition according to the present invention. For example, even when stress is applied onto a mounting board with the chip-type electronic component mounted thereon, a highly reliable chip-type electronic component can be provided which is able to prevent the electronic component device from being cracked.

DETAILED DESCRIPTION OF THE INVENTION

Features of the present invention will be described below in more detail with reference to embodiments of the present invention.

Example 1

In this Example 1, a conductive resin composition according to an example of the present invention was first produced. Then, the produced conductive resin composition was used to produce a chip-type electronic component (a laminated ceramic capacitor in this example) including a resin electrode as shown in FIG. 1.

Figure 1:
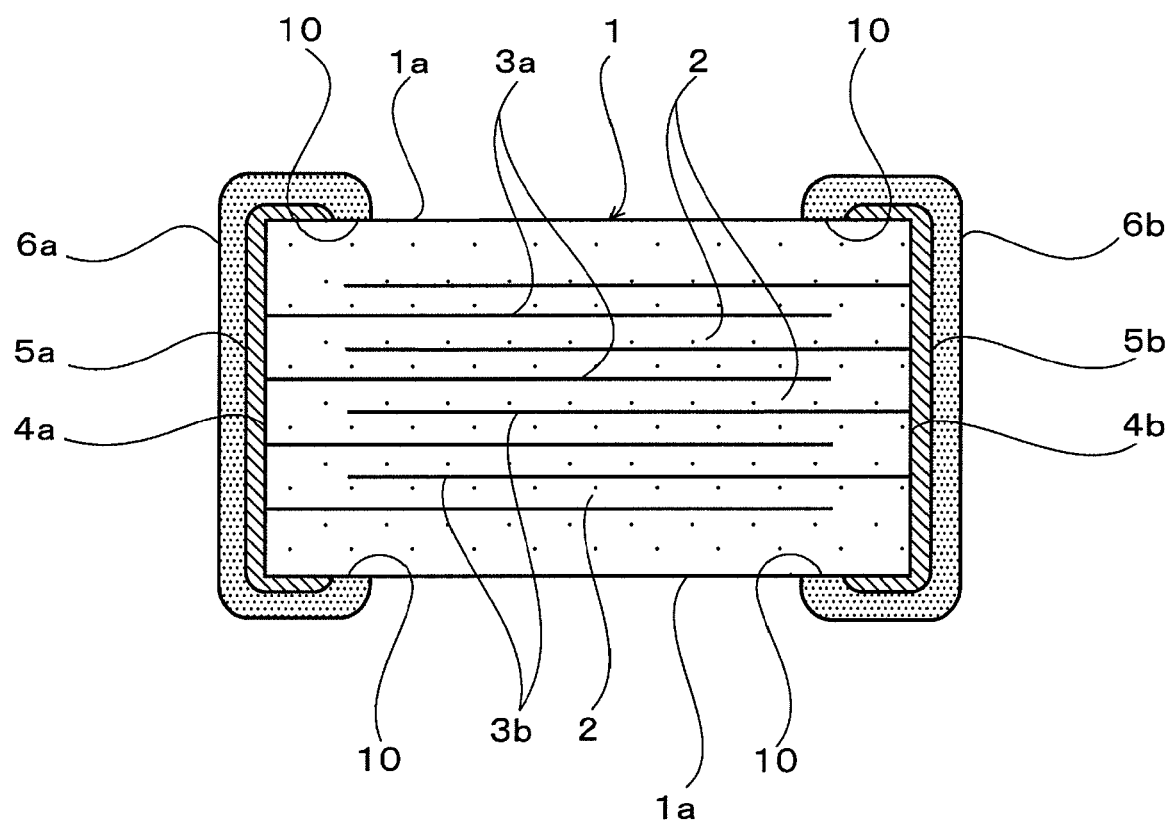
FIG. 1 is a cross-sectional view illustrating a chip-type electronic component including a resin electrode formed with a conductive resin composition according to the present invention.
Figure 2:
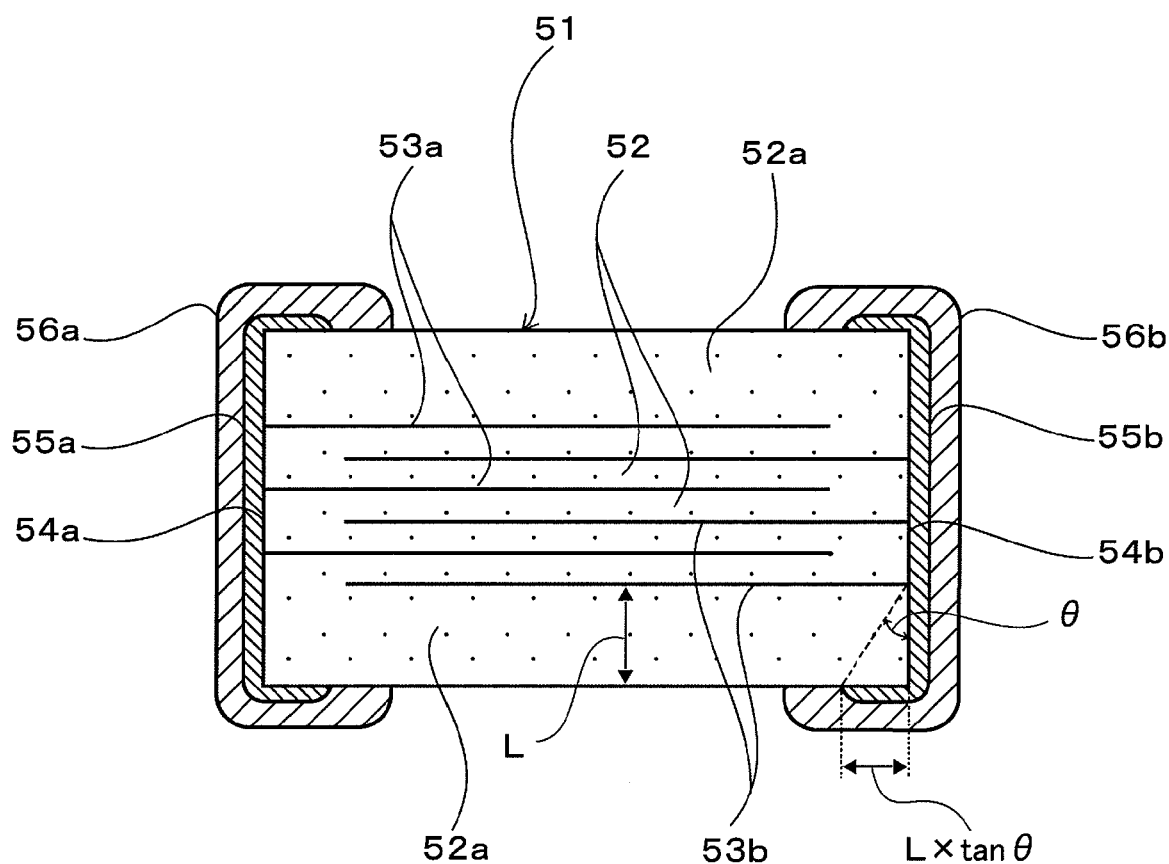
FIG. 2 is a cross-sectional view illustrating the structure of a chip-type electronic component including a conventional resin electrode.

More specifically, the chip-type electronic component (laminated ceramic capacitor) produced in accordance with this example includes, as shown in FIG. 1, a laminated ceramic device (capacitor device) 1 including ceramic layers 2 and internal electrodes 3a and 3b, end surface electrodes (fired electrodes) 5a and 5b formed by applying a conductive paste to both end surfaces 4a and 4b of the laminated ceramic device (capacitor device) 1 and firing it, and resin electrodes 6a and 6b provided so as to cover the end surface electrodes 5a and 5b. Further, the resin electrodes 6a and 6b are formed with the used of the conductive resin composition according to the present invention.

An explanation will be given below.

[1] Production of Conductive Resin Composition

First, a conductive resin composition for the formation of a resin electrode was produced in accordance with the following method. The respective raw materials were weighed so as to provide the compositions of sample numbers 1 to 3 in Table 1, mixed by a small-sized mixer, and then kneaded in a triple roll mill. After that, an aging treatment was carried out in order to promote an adsorption reaction.

For each conductive resin composition in Table 1, (a) bisphenol A epoxy resin with a molecular weight in a range of 11000 to 40000;

(b) novolac-type phenolic resin with a hydroxyl equivalent of 105 g/eq;

(c) imidazole;

(d) spherical silver powder (conductive powder) with a surface subjected to no surface treatment for providing a fatty acid or the like; and (e) butyl carbitol (diethylene glycol monobutyl ether) as a solvent were used as raw materials.

Then, the amount of the butyl carbitol as a solvent was adjusted to adjust the viscosity to 30±2 Pa·s. The viscosity was measured at the number of 1 rpm (revolutions per minute) by an E-type viscometer (TVE-30 from Toki Sangyo Co., Ltd.) with the use of a cone of 1° 34'×R24.

TABLE 1

Table of Compositions of Upper Layer Electrode (Thermosetting Conductive Resin) (unit: g)

|  | Example 1 Molecular Weight Mw = 31000 Epoxy Equivalent 2600 g/eq | Example 2 Molecular Weight Mw = 11000 Epoxy Equivalent 2000 g/eq | Example 3 Molecular Weight Mw = 40000 Epoxy Equivalent 3300 g/eq |
|---|---|---|---|
| Bisphenol A Epoxy Resin | 10.5 | 10.4 | 10.6 |
| Novolac-Type Phenolic Resin (Hydroxyl Equivalent 105 g/eq) | 0.4 | 0.5 | 0.3 |
| Imidazole (Curing Agent) | 0.1 | 0.1 | 0.1 |
| Conductive Powder A | 89.0 | 89.0 | 89.0 |
| Spherical Silver (D50 = 0.5 μm) (Without Surface Treatment) | (48 vol % of solids) | (48 vol % of solids) | (48 vol % of solids) |
| Diethylene Glycol Monobutyl Ether (BC) | 7 | 7 | 8 |

[2] Production of Laminated Ceramic Capacitor (Sample) for Evaluation

In this example, a laminated ceramic capacitor as shown in FIG. 1 was produced as described above as a laminated ceramic capacitor for evaluation. For the formation of the resin electrodes 6a and 6b, a conductive resin composition produced was used.

(1) Production of Laminated Ceramic Device (Capacitor Device)

For the production of the laminated ceramic capacitor (sample) for evaluation, the laminated ceramic device (capacitor device) 1 as a ceramic sintered body was first prepared, including the ceramic layers 2 and the internal electrodes 3a and 3b.

This laminated ceramic device 1 is a capacitor device which has dimensions of length L=3.2 mm, width W=1.6 mm, and thickness t=1.6 mm and has a capacitance of 10 μF.

(2) Formation of End Surface Electrode (Lower Layer Electrode)

Then, one end surface 4a of the prepared capacitor device 1 was immersed in a conductive paste (a conductive paste for the formation of an end surface electrode) with the composition shown in Table 2, and squeegeed to 300 μm in thickness to apply the conductive paste onto the end surface 4a of the capacitor device 1.

Further, spherical copper powder and flat copper powder were mixed for use as copper powder constituting the conductive paste.

Then, the prepared capacitor device 1 with the conductive paste applied was dried in an oven under a conditions of 120° C./15 min.

Next, the conductive paste was also applied to the other end surface 4b of the capacitor device 1 and dried in the same way.

TABLE 2

Composition of Conductive Paste for Formation of Lower Layer Electrode (Base Conductor) (unit: wt %)

| Acrylic Resin | 10 |
|---|---|
| Diethylene Glycol Monobutyl Ether | 5 |
| Terpineol | 15 |
| Glass Powder | 5 |
| Copper Powder A (Spherical Shape) | 20 |
| Copper Powder B (Flat Shape) | 45 |

After that, a heat treatment was carried out at a peak top temperature of 750° C. to form end surface electrodes (fired copper electrodes) 5a and 5b.

(3) Formation of Resin Electrode

For each of the conductive resin compositions (upper electrode (resin electrode) pastes) of sample numbers 1 to 3 in Table 1 produced and squeegeed to 600 µm in thickness, one end surface of the capacitor device 1 with the end surface electrode (lower layer electrode) 5a formed was immersed for dip coating of the conductive resin composition in a tank so as to cover the end surface electrode (lower layer electrode) 5a. In this case, the entry velocity and pull-up velocity of the capacitor device 1 into the conductive resin composition were set to 0.2 mm/s and 3.0 mm/s, respectively, and the retention time at the bottom dead point was set to 1.5 s.

Next, the capacitor device 1 with the conductive resin composition applied was placed in a programmed oven, in which the capacitor device 1 was dried under the conditions of 150° C./15 min (heat-up time 11° C./min up to 150° C.).

Subsequently, the conductive resin composition was also, applied to the other end surface of the capacitor device 1 in the same way so as to cover the end surface electrode (lower layer electrode) 5b, and dried.

Next, the conductive resin composition was thermally cured under the conditions of peak top temperature=200° C., retention time=2 h, and atmosphere=air atmosphere, to form the resin electrodes (upper layer electrodes) 6a and 6b.

(4) Formation of Plating Film

The capacitor device with the external electrodes formed, each external electrode composed of the end surface electrode and the resin electrode, was placed in a barrel, in which wet electrolytic barrel plating was carried out to form the following plating films on the resin electrodes.

a) first plating film (lower layer): Ni (thickness=about 3.5±1.5 µm)

b) second plating film (upper layer): Sn (thickness=about 3.5±1.5 µm)

In this way, a laminated ceramic capacitor is obtained which has a structure as shown in FIG. 1. The first and second plating films are not shown in FIG. 1.

[3] Characterization

For the conductive resin compositions produced in the section [1] and the laminated ceramic capacitors (chips for evaluation) produced in the section [2], the properties were investigated in accordance with methods described below.

(1) Yield Value of Conductive Resin Composition

First, the shear stress was measured for the conductive resin compositions produced in the section [1] under the following conditions by an E-type viscometer TVE-30 (from Toki Sangyo Co., Ltd.).

Rotor Used First Rotor (Cone: 1° 34'×R24)

Measurement Temperature: 25° C.

Number of Revolutions for Measurement: 1.5 rpm/5 min
　1.0 rpm/5 min
　0.6 rpm/5 min
　0.3 rpm/5 min Then, the square roots of the measured "shear rate" and "shear stress" for each number of revolutions were each plotted on x and y axes, and the intercept of the line, obtained from the plot by the approximation in accordance with the least-squares method, was read to obtain the square of the intercept value as a yield value (unit: Pa).

Herein, the "shear rates" for each number of revolutions are as follows.

1.5 rpm: 5.745 [s-1]
　1.0 rpm: 3.830 [s-1]
　0.6 rpm: 2.298 [s-1]
　0.3 rpm: 1.149 [s-1]

(2) Shape Property of Resin Electrode (Shape of Applied Conductive Resin Composition)

In order to quantify the end surface shapes (degree mountain shape) of the resin electrodes of the produced laminated ceramic capacitors (samples), the resin was hardened and then subjected to DPA, and the end surface corner angle of the resin electrode was checked at 200-fold magnification under a microscope (n=20). The resin electrode was evaluated as good (○) if the end surface corner angle was 163° or more, or evaluated as defective (x) if the end surface corner angle was less than 163°.

(3) Adhesion of Resin Electrode after Immersion in Solder

The produced laminated ceramic capacitors were immersed in a solder bath (Sn-3.0 Ag-0.5 Cu (M705 from Senju Metal Industry Co., Ltd.)) warmed to 270° C. for 10 s.

After that, the laminated ceramic capacitors were subjected to hardening of the resin and then to DPA, and observed at 500-fold magnification under a stereoscopic microscope in terms of presence or absence of peeled edges of the resin electrodes (n=20). As used herein, the edge of the resin electrode refers to, when an explanation is given with reference to FIG. 1, sections 10 of the resin electrodes 6a and 6b expanding to side surfaces 1a and in contact with the capacitor device 1.

A peeled resin electrode refers to the condition in which the section 10 of the resin electrode 6a or 6b in contact with the capacitor device 1 is peeled from the capacitor device 1. If no peeled resin electrode was observed after the immersion in solder, the adhesion was determined as good (○), or if any peeled resin electrode was observed, the adhesion was determined as defective (x).

(4) Occurrence of Microcrack at End Surface of Resin Electrode

The surfaces of the resin electrodes 6a and 6b formed on the end surfaces 4a and 4b of the capacitor device 1 were observed under an optical microscope (30-fold magnification) to confirm the presence or absence of microcracks (cracking) and check the occurrence of microcracks (n=5). Then, a surface without any microcracks was evaluated as good (○), the surface with some microcracks but without any practical problems was evaluated as pass (Δ), and the surface with a number of microcracks observed and probably leading to practical problems was evaluated as defective (x).

(5) Workability in Application of Conductive Resin Composition

It was confirmed whether or not there was a possibility that, when the conductive resin composition was applied to the capacitor device, evaporation of the solvent increased the viscosity of the conductive resin composition to adversely affect the applied conductive resin composition, and the conductive resin composition which was not particularly problematic was evaluated as good (○), whereas the conductive resin composition which was not particularly problematic but might lead to a decrease in workability to a certain degree was evaluated as pass (Δ).

[4] Evaluation Results

The results of measuring the properties are shown in Table 3A along with the other conditions.

TABLE 3A

| | Constitution of Upper Layer Electrode (Resin Electrode) Paste | | | | | | | | |
|---|---|---|---|---|---|---|---|---|---|
| | Epoxy Resin | | | Conductive Powder | | | | | |
| Sample Number | Molecular Weight Mw | Type | Curing Agent Type | Shape | D50 (μm) | Type | Surface Treatment Type/ Quantity | Combination Amount in Solids (vol %) | Solvent Type/ Quantity |
| 1 | 31000 | BPA | Phenol/Imidazole | Spherical | 0.5 | Silver | No | 48 | BC/100 wt % |
| 2 | 11000 | BPA | Phenol/Imidazole | Spherical | 0.5 | Silver | No | 48 | BC/100 wt % |
| 3 | 40000 | BPA | Phenol/Imidazole | Spherical | 0.5 | Silver | No | 48 | BC/100 wt % |
| 4 | 30000 | BPF | Phenol/Imidazole | Spherical | 0.5 | Silver | No | 48 | BC/100 wt % |
| 5 | 31000 | BPA | Phenol/Imidazole | Spherical | 0.3 | Silver | No | 48 | BC/100 wt % |
| 6 | 31000 | BPA | Phenol/Imidazole | Spherical | 1.0 | Silver | No | 48 | BC/100 wt % |
| 7 | 31000 | BPA | Phenol/Imidazole | Spherical | 0.5 | Silver Coated | No | 48 | BC/100 wt % |

| Sample Number | Chip for Evaluation Type of Base Conductor | Property of Paste Yield Value (Pa) | Properties of Chip End Surface Shape of Resin Electrode | Adhesion of Resin Electrode after Immersion in Solder | Microcrack at End Surface of Resin Electrode Rate of Temperature Increase ° C./min | Determination | Workability of Paste in Application of Resin Electrode |
|---|---|---|---|---|---|---|---|
| 1 | Thick Film Copper | 1.8 | ○ | ○ | 11 | ○ | ○ |
| 2 | Thick Film Copper | 3.6 | ○ | ○ | 11 | ○ | ○ |
| 3 | Thick Film Copper | 2.1 | ○ | ○ | 11 | ○ | ○ |
| 4 | Thick Film Copper | 2.0 | ○ | ○ | 11 | ○ | ○ |
| 5 | Thick Film Copper | 2.0 | ○ | ○ | 11 | ○ | ○ |
| 6 | Thick Film Copper | 1.7 | ○ | ○ | 11 | ○ | ○ |
| 7 | Thick Film Copper | 2.5 | ○ | ○ | 11 | ○ | ○ |

In the case of the conductive resin compositions (upper layer electrode (resin electrode) pastes) of sample numbers 1 to 3 produced in Example 1, the conductive powder subjected to no treatment for providing a fatty acid or the like on the surface was used, resulting in a reduction in interaction between the polymeric epoxy resin and the conductive powder.

As a result, it has been confirmed that the yield value (see the "Yield Value" in the column "Property of Paste" of Table 3A) is low, whereas the shape of the conductive resin composition applied to the end surfaces of the capacitor device (see the "End Surface Shape of Resin Electrode" in the column "Properties of Chip" of Table 3A) is favorable in the case of forming the resin electrodes by carrying out the application, drying, and curing of each conductive resin composition.

In addition, it has been confirmed that because of the use the polymeric epoxy resin for the resin electrodes, highly reliable laminated ceramic capacitors are obtained which include the resin electrodes with favorable adhesion to the capacitor device (ceramic device) (see the "Adhesion of Resin Electrode after Immersion in Solder" in the column "Properties of Chip" of Table 3A).

Regarding the other properties (the occurrence of cracks, the application workability, etc. other than the yield value, applied shape, and adhesion of the conductive resin composition), particularly problematic behaviors were also not observed (see the "Workability of Paste in Application of Resin Electrode" in the column "Other Finished Conditions of Chip" of Table 3A).

Example 2

Bisphenol F epoxy resin was used instead of the bisphenol A epoxy resin in Example 1 to produce a conductive resin composition of sample number 4 in Table 3A.

Specifically, the bisphenol A epoxy resin (Molecular Weight Mw=31000, Epoxy Equivalent: 2600 g/eq) used for sample number 1 in Example 1 was changed to bisphenol F epoxy resin (Molecular Weight Mw=30000, Epoxy Equivalent: 2231 g/eq) to produce the conductive resin composition of sample number 4. The other conditions were made in the same way as in Example 1.

The obtained conductive resin composition was used to produce a laminated ceramic capacitor including resin electrodes in accordance with the same method as in Example 1.

The other conditions were the same as in Example 1.

The properties, etc. of the conductive resin composition (sample number 4) in Example 2 and of the laminated ceramic capacitor including the resin electrodes produced with the conductive resin composition are shown together in Table 3A.

As shown in sample number 4 of Table 3A, it has been also confirmed in the case of Example 2 that the conductive resin composition and the laminated ceramic capacitor including the resin electrodes produced with the conductive resin composition exhibit the same properties as in Example 1.

Example 3

In Example 3, the grain size of the conductive powder (silver powder) constituting the conductive resin composition was changed to produce another conductive resin compositions.

Specifically, the average grain size D50 of the conductive powder (silver powder) used in Example 1 was changed from 0.5 μm to 0.3 μm (sample number 5) or 1.0 μm (sample number 6) to produce conductive resin compositions. The other conditions were the same as in Example 1.

Then, the obtained conductive resin compositions were used to produce laminated ceramic capacitors including resin electrodes in accordance with the same method as in Example 1.

The properties, etc. of the conductive resin compositions (sample numbers 5 and 6) in Example 3 and of the laminated ceramic capacitors including the resin electrodes produced with the conductive resin compositions are shown together in Table 3A.

As shown in sample numbers 5 and 6 of Table 3A, it has been also confirmed in the case of Example 3 that the conductive resin compositions and the laminated ceramic capacitors including the resin electrodes produced with the conductive resin compositions exhibit the same properties as in Example 1.

Example 4

In Example 4, a conductive powder with a surface coated with silver (silver coated copper powder) was used instead of the conductive powder, that is, the silver powder used in Example 1 to produce a conductive resin composition of sample number 7 in Table 3A. The other conditions were the same as in Example 1.

Then, the obtained conductive resin composition was used to produce a laminated ceramic capacitor including resin electrodes in accordance with the same method as in Example 1.

The properties, etc. of the conductive resin composition in Example 4 and of the laminated ceramic capacitor including the resin electrodes produced with the conductive resin composition are shown together in Table 3A.

As shown in sample number 7 of Table 3A, it has been also confirmed in the case of Example 4 that the conductive resin composition and the laminated ceramic capacitor including the resin electrodes produced with the conductive resin composition exhibit the same properties as in Example 1.

Example 5

In Example 5, the conductive powder (silver powder) used in Example 1 but with its surface attached to (coated with) about 0.5 wt % fatty acid (palmitic acid) (sample number 8 in Table 3B), and a silver powder with a surface attached to (coated with) about 0.5 wt % fatty acid (stearic acid) (sample number 9 in Table 3B) were used to produce conductive resin compositions. The other conditions were the same as in Example 1. Then, the obtained conductive resin compositions were used to produce laminated ceramic capacitors including resin electrodes in accordance with the same method as in Example 1.

The properties, etc. of the conductive resin compositions (sample numbers 8 and 9) in Example 5 and of the laminated ceramic capacitors including the resin electrodes produced with the conductive resin compositions are shown together in Table 3B.

TABLE 3B

| | Constitution of Upper Layer Electrode (Resin Electrode) Paste | | | | | | | | |
|---|---|---|---|---|---|---|---|---|---|
| | Epoxy Resin | | | Conductive Powder | | | | | |
| | | | | | | | Surface | Combination | |
| Sample Number | Molecular Weight Mw | Type | Curing Agent Type | Shape | D50 (μm) | Type | Treatment Type/ Quantity | Amount in Solids (vol %) | Solvent Type/ Quantity |
| 8 | 31000 | BPA | Phenol/ Imidazole | Spherical | 0.5 | Silver | Palmitic Acid/ 0.5 wt % | 48 | BC/ 100 wt % |
| 9 | 31000 | BPA | Phenol/ Imidazole | Spherical | 0.5 | Silver | Stearic Acid/ 0.5 wt % | 48 | BC/ 100 wt % |
| 10 | 31000 | BPA | Phenol/ Imidazole | Spherical | 0.5 | Silver | No | 42 | BC/ 100 wt % |
| 11 | 31000 | BPA | Phenol/ Imidazole | Spherical | 0.5 | Silver | No | 54 | BC/ 100 wt % |
| 12 | 31000 | BPA | Phenol/ Imidazole | Spherical | 0.3 | Silver | No | 48 | BC/ 100 wt % |

TABLE 3B-continued

| | | Property of Paste Yield Value (Pa) | Properties of Chip | | Other Finished Conditions of Chip | | |
|---|---|---|---|---|---|---|---|
| | | | | | Microcrack at End Surface of Resin Electrode | | |
| Sample Number | Chip for Evaluation Type of Base Conductor | | End Surface Shape of Resin Electrode | Adhesion of Resin Electrode after Immersion in Solder | Rate of Temperature Increase ° C./min | Determination | Workability of Paste in Application of Resin Electrode |
| 8 | Thick Film Copper | 3.1 | ○ | ○ | 11 | ○ | ○ |
| 9 | Thick Film Copper | 3.2 | ○ | ○ | 11 | ○ | ○ |
| 10 | Thick Film Copper | 1.6 | ○ | ○ | 11 | ○ | ○ |
| 11 | Thick Film Copper | 2.3 | ○ | ○ | 11 | ○ | ○ |
| 12 | Plated copper | 1.8 | ○ | ○ | 11 | ○ | ○ |

As shown in sample numbers 8 and 9 of Table 3B, it has been confirmed that even when the fatty acid (palmitic acid or stearic acid) is attached to the surface of the conductive powder (silver powder), an increased yield value is not observed, with the result that the same properties as in Example 1 are obtained.

In addition, it has been also confirmed that the laminated ceramic capacitors including the resin electrodes produced with the respective conductive resin compositions (sample numbers 8 and 9) in Example 5 also exhibit the same properties as in Example 1.

It has been also confirmed in the case of using a fatty acid salt for the fatty acid that the same results as in Example 5 are obtained.

Example 6

In Example 6, the combination ratio of the conductive powder was changed from 48 vol % for the conductive resin compositions of sample numbers 1 to 3 in Example 1 to 42 vol % (sample number 10 in Table 3B) or 54 vol % (sample number 11 in Table 3B) to produce conductive resin compositions. The other conditions were the same as in Example 1.

Then, the obtained conductive resin compositions were used to produce laminated ceramic capacitors including resin electrodes in accordance with the same method as in Example 1.

The properties, etc. of the conductive resin compositions (sample numbers 10 and 11) in Example 6 and of the laminated ceramic capacitors including the resin electrodes produced with the conductive resin compositions are shown together in Table 3B.

As shown in sample numbers 10 and 11 of Table 3B, it has been also confirmed in the case of Example 6 for varying the combination ratio of the conductive powder in the conductive resin composition, that the conductive resin compositions and the laminated ceramic capacitors including the resin electrodes produced with the conductive resin compositions exhibit the same properties as in Example 1.

Example 7

In Example 7, the same conductive resin composition as in Example 1 was used to produce a laminated ceramic capacitor (sample number 12 in Table 3B) under the same conditions as in Example 1, except that the lower layer electrode (base conductor) of the laminated ceramic capacitor was changed from the fired copper electrode in sample numbers 1 to 3 to a copper electrode formed by plating.

The properties examined for the laminated ceramic capacitor produced in Example 7 are shown together in Table 3B.

As shown in sample number 12 of Table 3B, it has been confirmed that the laminated ceramic capacitor in Example 7 with the plated copper electrode as the lower layer electrode (base conductor) also exhibit the same properties as in Example 1.

Example 8

In Example 8, the drying temperature after the application of the conductive resin composition for the formation of resin electrodes with the conductive resin composition was changed from 11° C./min in Example 1 to 25° C./min to form resin electrodes (sample numbers 13 to 17 in Table 3C).

In addition, the solvent composition of the conductive resin composition was BC (butyl carbitol):DAA (diacetone alcohol)=100:0 for sample number 13, which was the same composition as in Example 1 (sample numbers 1 to 3) described above, and was varied to BC:DAA=85:15 for sample number 14, BC:DAA=70:30 for sample number 15, BC:DAA=55:45 for sample number 16, and BC:DAA=40:60 for sample number 17.

Then, the obtained conductive resin compositions (sample numbers 13 to 17 in Table 3C) were used to produce laminated ceramic capacitors including resin electrodes in accordance with the same method as in Example 1.

The measurement results such as the properties of the conductive resin compositions (sample numbers 13 to 17 in Table 3C) in Example 8 and of the laminated ceramic capacitors including the resin electrodes produced with the conductive resin compositions are shown together in Table 3C.

TABLE 3C

Constitution of Upper Layer Electrode (Resin Electrode) Paste

| | Epoxy Resin | | | Conductive Powder | | | | | |
|---|---|---|---|---|---|---|---|---|---|
| Sample Number | Molecular Weight Mw | Type | Curing Agent Type | Shape | D50 (μm) | Type | Surface Treatment Type/ Quantity | Combination Amount in Solids (vol %) | Solvent Type/ Quantity |
| 13 | 31000 | BPA | Phenol/Imidazole | Spherical | 0.5 | Silver | No | 48 | BC/100 wt % |
| 14 | 31000 | BPA | Phenol/Imidazole | Spherical | 0.5 | Silver | No | 48 | BC/85 wt % DAA/15 wt % |
| 15 | 31000 | BPA | Phenol/Imidazole | Spherical | 0.5 | Silver | No | 48 | BC/70 wt % DAA/30 wt % |
| 16 | 31000 | BPA | Phenol/Imidazole | Spherical | 0.5 | Silver | No | 48 | BC/55 wt % DAA/45 wt % |
| 17 | 31000 | BPA | Phenol/Imidazole | Spherical | 0.5 | Silver | No | 48 | BC/40 wt % DAA/60 wt % |

| | | Properties of Chip | | Other Finished Conditions of Chip | | | |
|---|---|---|---|---|---|---|---|
| | | | | Microcrack at End Surface of Resin Electrode | | | |
| Sample Number | Chip for Evaluation Type of Base Conductor | Property End of Paste Yield Value (Pa) | Surface Shape of Resin Electrode | Adhesion of Resin Electrode after Immersion in Solder | Rate of Temperature Increase ° C./min | Determination | Workability of Paste in Application of Resin Electrode |
| 13 | Thick Film Copper | 1.8 | ○ | ○ | 25 | Δ | ○ |
| 14 | Thick Film Copper | 1.8 | ○ | ○ | 25 | Δ | ○ |
| 15 | Thick Film Copper | 1.8 | ○ | ○ | 25 | ○ | ○ |
| 16 | Thick Film Copper | 1.8 | ○ | ○ | 25 | ○ | ○ |
| 17 | Thick Film Copper | 1.8 | ○ | ○ | 25 | ○ | Δ |

As shown in Table 3C, the resin electrode formed on the end surface electrode in the case of the rate of temperature increase of 25° C./min for drying had minute microcracks when the solvent composition was the same composition (BC=100 wt %) as that of sample numbers 1 to 3 of Example 1 (sample number 13).

In the case of sample number 14 for which the replacement ratio of DAA was 15 wt % with respect to the solvent BC, the resin electrode formed on the end surface electrode also had minute microcracks.

While the occurrence of the microcracks in the case of sample numbers 13 and 14 was not problematic for practical use, the microcracks are not particularly preferable from the standpoint of appearance.

On the other hand, it was found that, when the replacement ratio of DAA was greater than 30 wt % with respect to the solvent BC, the resin electrode formed on the end surface electrode was prevented from having microcracks, thus providing laminated ceramic capacitors with favorable properties in terms of appearance (sample numbers 15 to 17).

This is believed that this is the result of the DAA, which is a quick-drying solvent with higher vapor pressure, which accelerates the progression of drying to keep the paste from flowing in the process of drying. However, as in sample number 17 with the replacement ratio of DAA with respect to the solvent BC greater than 60 wt %, the increased ratio of the DAA had a tendency to increase the viscosity during application to somewhat decrease the workability, although the application was workable. Therefore, the solvent composition is desirably determined in view of conditions of use, etc.

Further, in terms of the other respects, it has been confirmed that the respective samples in Example 8 achieve the same effects as in Example 1.

Example 9

In Example 9, the solvent DAA (diacetone alcohol) used in the conductive resin composition of sample number 15 in Example 8 was replaced with other quick-drying solvents (benzyl alcohol (sample number 18 in Table 3D), propylene glycol methyl ether acetate (sample number 19 in Table 3D), propylene glycol methyl ether (sample number 20 in Table 3D)) to produce conductive resin compositions. The other conditions were the same as in Example 7.

TABLE 3D

| | Constitution of Upper Layer Electrode (Resin Electrode) Paste | | | | | | | | |
|---|---|---|---|---|---|---|---|---|---|
| | Epoxy Resin | | | Conductive Powder | | | | | |
| | | | | | | | Surface | Combination | |
| Sample Number | Molecular Weight Mw | Type | Curing Agent Type | Shape | D50 (μm) | Type | Treatment Type/ Quantity | Amount in Solids (vol %) | Solvent Type/ Quantity |
| 18 | 31000 | BPA | Phenol/ Imidazole | Spherical | 0.5 | Silver | No | 48 | BC/ 70 wt % Benzyl Alcohol/ 30 wt % |
| 19 | 31000 | BPA | Phenol/ Imidazole | Spherical | 0.5 | Silver | No | 48 | BC/ 70 wt % Propylene Glycol Methyl Ether Acetate/ 30 wt % |
| 20 | 31000 | BPA | Phenol/ Imidazole | Spherical | 0.5 | Silver | No | 48 | BC/ 70 wt % Propylene Glycol Methyl Ether/ 30 wt % |
| 21 (Comparative Example 1) | 5700 | BPA | Phenol/ Imidazole | Spherical | 0.5 | Silver | No | 48 | BC/ 100 wt % |
| 22 (Comparative Example 2) | 31000 | BPA | Phenol/ Imidazole | Spherical | 0.5 | Silver | Palmitic Acid/ 2.5 wt % | 48 | BC/ 100 wt % |
| 23 (Comparative Example 2) | 31000 | BPA | Phenol/ Imidazole | Spherical | 0.5 | Silver | Stearic Acid/ 2.5 wt % | 48 | BC/ 100 wt % |

| | | Properties of Chip | | | Other Finished Conditions of Chip | | |
|---|---|---|---|---|---|---|---|
| | | | | Adhesion of Resin | Microcrack at End Surface of Resin Electrode | | |
| | | Property of Paste Yield | End Surface Shape of Resin | Electrode after Immersion | Rate of Temperature Increase | Deter- | Workability of Paste in Application of Resin |
| Sample Number | Chip for Evaluation Type of Base Conductor | Value (Pa) | Electrode | in Solder | ° C./min | mination | Electrode |
| 18 | Thick Film Copper | 1.8 | ○ | ○ | 25 | ○ | ○ |
| 19 | Thick Film Copper | 1.8 | ○ | ○ | 25 | ○ | ○ |
| 20 | Thick Film Copper | 1.9 | ○ | ○ | 25 | ○ | ○ |
| 21 (Comparative Example 1) | Thick Film Copper | 8.1 | X | X | 11 | — | — |
| 22 (Comparative Example 2) | Thick Film Copper | 7.6 | X | ○ | 11 | — | — |
| 23 (Comparative Example 2) | Thick Film Copper | 9.8 | X | ○ | 11 | — | — |

The obtained conductive resin compositions (sample numbers 18 to 20) were used to produce laminated ceramic capacitors including resin electrodes in accordance with the same method as in Example 1.

The properties, etc. of the conductive resin compositions (sample numbers 18 to 20) in Example 9 and of the laminated ceramic capacitors including the resin electrodes produced with the conductive resin compositions are shown together in Table 3D.

As shown in sample numbers 18 to 20 of Table 3D, it has been also confirmed in the case of Example 9 that the conductive resin compositions and the laminated ceramic capacitors including the resin electrodes produced with the conductive resin compositions exhibit the same properties as in Example 1.

Example 10

In Example 10, conductive resin compositions (upper layer electrode (resin electrode) pastes) were produced which had the same composition as that of the conductive resin composition of sample number 1 in Example 1, except that silver powder used was spherical, having D50 of 0.5 μm, and had a surface coated with a triazole compound or an imidazole compound.

More specifically, with the silver powder described below having a surface coated with a triazole compound or an imidazole compound, and the same epoxy resin as that used in the conductive resin composition of sample number 1 in Example 1, a curing agent, and a solvent was weighed to provide the ratio as shown in Table 3E, mixed by a small-sized mixer, and then kneaded in a triple roll mill to produce conductive resin compositions of sample numbers 24, 25, 26, and 27 in Table 3E.

The aging treatment carried out in Example 1 for stabilizing the adsorbed state between the less active Ag and the epoxy resin was not carried out in Example 10.

Then, the conductive resin compositions of sample numbers 24 to 27 were used to produce laminated ceramic capacitors including resin electrodes under the same conditions as in Example 1.

Silver Powder Used in Example 10

In Example 10, a silver powder with a surface coated with 1-methylbenzotriazole, which is solid at ordinary temperature, as the triazole compound was used for sample number 24 and sample number 25 in Table 3E.

The coating amount of 1-methylbenzotriazole was adjusted to a ratio of 0.5 wt % of the coated silver powder for sample number 24, and to a ratio of 1.5 wt % of the coated silver powder for sample number 25.

For sample numbers 26 and 27, a silver powder with a surface coated with 2-methylimidazole, which is solid at ordinary temperature, as the imidazole compound, was used.

The coating amount of 2-methylimidazole was adjusted to a ratio of 0.5 wt % of the coated silver powder for sample number 26, and to a ratio of 1.5 wt % of the coated silver powder for sample number 27.

While the entire surface of the conductive powder is preferably coated in the case of coating the surface of the conductive powder (the silver powder in this example) with the triazole compound or the imidazole compound, the surface may be partially exposed.

The compositions of the conductive resin compositions (sample numbers 24 to 27) in Example 10 and the properties of the laminated ceramic capacitors including the resin electrodes produced with the conductive resin compositions are shown together in Table 3E.

Further, Table 3E shows the data on sample number 1 in Table 3A of Example 1.

TABLE 3E

| | Constitution of Upper Layer Electrode (Resin Electrode) Paste | | | | | | | | |
|---|---|---|---|---|---|---|---|---|---|
| | Epoxy Resin | | | Conductive Powder | | | Surface | Combination | |
| Sample Number | Molecular Weight Mw | Type | Curing Agent Type | Shape | D50 (μm) | Type | Treatment Type/ Quantity | Amount in Solids (vol %) | Solvent Type/ Quantity |
| 1 | 31000 | BPA | Phenol/ Imidazole | Spherical | 0.5 | Silver | No | 48 | BC/ 100 wt % |
| 24 | 31000 | BPA | Phenol/ Imidazole | Spherical | 0.5 | Silver | 1-methyl-benzotriazole/ 0.5 wt % | 48 | BC/ 100 wt % |
| 25 | 31000 | BPA | Phenol/ Imidazole | Spherical | 0.5 | Silver | 1-methyl-benzotriazole/ 1.5 wt % | 48 | BC/ 100 wt % |
| 26 | 31000 | BPA | Phenol/ Imidazole | Spherical | 0.5 | Silver | 2-methyl-imidazole/ 0.5 wt % | 48 | BC/ 100 wt % |
| 27 | 31000 | BPA | Phenol/ Imidazole | Spherical | 0.5 | Silver | 2-methyl-imidazole/ 1.5 wt % | 48 | BC/ 100 wt % |

| | | Properties of Chip | | | Other Finished Conditions of Chip | | |
|---|---|---|---|---|---|---|---|
| | | | | Adhesion of Resin | Microcrack at End Surface of Resin Electrode | | |
| Sample Number | Property Chip for Evaluation Type of Base Conductor | End of Paste Yield Value (Pa) | Surface Shape of Resin Electrode | Electrode after Immersion in Solder | Rate of Temperature Increase ° C./min | Determination | Workability of Paste in Application of Resin Electrode |
| 1 | Thick Film Copper | 1.8 | ○ | ○ | 11 | ○ | ○ |

TABLE 3E-continued

| 24 | Thick Film Copper | 2.3 | ○ | ○ | 11 | ○ | ○ |
| 25 | Thick Film Copper | 2.4 | ○ | ○ | 11 | ○ | ○ |
| 26 | Thick Film Copper | 3.1 | ○ | ○ | 11 | ○ | ○ |
| 27 | Thick Film Copper | 3.3 | ○ | ○ | 11 | ○ | ○ |

For sample number 1, aging step was carried out in the production of an upper electrode paste (conductive resin composition).
For sample numbers 24 to 27, no aging step was carried out in the production of an upper electrode paste (conductive resin composition).

Table 3E confirms in the case of Example 10 that the conductive resin compositions and the laminated ceramic capacitors including the resin electrodes produced with the conductive resin compositions exhibit the same properties as in Example 1.

It also confirms that when the conductive resin compositions in Example 10 are used, the shapes of the applied conductive resin compositions (pastes) are sufficiently favorable because the triazole compound and imidazole compound for coating the surfaces of the silver powders have wettability (compatibility) with the epoxy resin.

In addition, it has been confirmed that the conductive resin compositions in Example 10 have a tendency to exhibit a somewhat higher yield value, and at the same time, have higher adsorption stability, as compared with the case of applying no surface treatment to the silver powder (the case of Example 1), and is thus able to maintain favorable shapes without carrying out an aging treatment (as described above, the aging treatment for promoting the adsorption reaction was not carried out in the process of producing the conductive resin compositions in Example 10).

Comparative Example 1

Bisphenol A epoxy resin with a molecular weight lower than that of the bisphenol A epoxy resin used for the conductive resin composition in Example 1 was used to produce a conductive resin composition with a composition as shown in Table 4 (see Table 4 and sample number 21 in Table 3D) as a conductive resin composition for comparison. It is to be noted that the other conditions were the same as in Example 1.

TABLE 4

Composition of Conductive Resin Composition in Comparative Example 1
(unit: g)

|  | Molecular Weight Mw = 5700 Epoxy Equivalent 925 g/eq |
| --- | --- |
| Bisphenol A Epoxy Resin | 9.8 |
| Novolac-Type Phenolic Resin (Hydroxyl Equivalent 105 g/eq) | 1.1 |
| Imidazole (Curing Agent) | 0.1 |
| Conductive Powder A Spherical Silver (D50 = 0.5 μm) (Without Surface Treatment) | 89.0 (48 vol % of solids) |
| Diethylene Glycol Monobutyl Ether (BC) | 5 |

Then, the obtained conductive resin composition for comparison was used to produce a laminated ceramic capacitor including resin electrodes in accordance with the same method as in Example 1.

The properties, etc. of the conductive resin composition (sample number 21) in Comparative Example 1 and of the laminated ceramic capacitor including the resin electrodes produced with the conductive resin composition are shown in Table 3D.

As shown in sample number 21 of Table 3D, it has been confirmed that because of the use of the low molecular weight epoxy resin in the case of the conductive resin composition in Comparative Example 1, the adhesion of the formed resin electrodes to the capacitor device is low as compared with the case of using the conductive resin composition according to the requirements of the present invention.

In addition, it has been confirmed that the increased interaction of the conductive powder with the epoxy resin results in an increase in the yield value of the conductive resin composition, and in deterioration in the shapes of the resin electrodes formed over the end surfaces of the capacitor device with the lower layer electrodes interposed therebetween, because the silver powder with a surface unchanged without being subjected to a surface treatment was used as the conductive powder to shift the surface condition to the hydrophilic side, whereas the low molecular weight epoxy resin was used as the epoxy resin.

Comparative Example 2

In Comparative Example 2, the conductive powder (silver powder) used in Example 1 with a surface attached to (coated with) about 2.5 wt % palmitic acid as a fatty acid (sample number 22 in Table 3D), and the conductive powder with a surface attached to (coated with) about 2.5 wt % stearic acid as a fatty acid (sample number 23 in Table 3D) were used to produce conductive resin compositions. The other conditions were the same as in Example 1.

Then, the obtained conductive resin compositions were used to produce laminated ceramic capacitors including resin electrodes in accordance with the same method as in Example 1.

The properties, etc. of the conductive resin compositions (sample numbers 22 and 23) in Comparative Example 2 and of the laminated ceramic capacitors including the resin electrodes produced with the conductive resin compositions are shown together in Table 3D.

As shown in sample numbers 22 and 23 of Table 3D, in the case of the conductive resin compositions in Comparative Example 2, the surface condition of the conductive powder was shifted toward hydrophobicity to increase the interaction with the polymeric epoxy resin, and thus increase the yield value of the conductive resin composition, because the large amount, 2.5 wt % of fatty acid (palmitic acid or stearic acid) was provided on the surface of the conductive powder (silver powder). As a result, it has been confirmed that the resin electrodes formed over the end surfaces of the capacitor device with the lower layer electrodes interposed therebetween have shapes deteriorated.

As described above, it has been confirmed from the results of Examples 1 to 10 and Comparative Examples 1 and 2 that the conductive resin compositions according to the requirements of the present invention have a moderate fluidity, and the use of the conductive resin composition according to the present invention allows resin electrodes with a high degree of shape accuracy and with excellent adhesion to electronic component devices such as capacitor devices to be formed efficiently and even reliably.

In addition, it has been confirmed that when the conditions specified in the dependent claims of the present invention are met in terms of the amount of the fatty acid attached to the surface of the conductive powder, the shape and combination ratio of the conductive powder, the type of the epoxy resin constituting the conductive resin composition, the type of the solvent, etc., highly reliable conductive resin compositions and chip-type electronic components with more favorable properties are obtained.

While the cases of using the fired electrode or plated electrode as the lower layer electrode to serve as a base for the resin electrode have been described as examples in the examples described above, it is possible to apply the conductive resin composition according to the present invention also in the case of forming resin electrodes directly on the end surfaces of chip-type electronic component devices such as capacitor devices.

Furthermore, while the cases of adopting laminated ceramic capacitors as chip-type electronic components subjected to the formation of the resin electrodes have been described as examples in the examples described above, it is possible apply the present invention in the case of forming resin electrodes for a variety of chip-type electronic components such as chip-type coil components and chip-type LC composite components.

The present invention is further not to be considered limited to the examples described above in terms of the other respects, it is possible within the scope of the present invention to find a wide range of application and make a variety of modifications in terms of the constitution material of the internal electrodes, the specific shape of the electronic component device, the composition of the conductive powder used for the conductive resin composition, the type of the solvent, etc.

What is claimed is:

1. A thermally cured product of a conductive resin composition comprising:
    a linear bifunctional epoxy resin having a molecular weight of 11000 to 40000 and having a glycidyl group at a molecular end; a conductive powder having a silver surface; and a solvent, wherein
    the composition has a yield value of 3.6 Pa or less, and
    the linear bifunctional epoxy resin is of a type that remains in the conductive resin composition after application to a chip electronic component, drying of the conductive resin composition, and thermally curing the conductive resin composition.

2. A thermally cured product of a conductive resin composition according to claim 1 in which the conductive powder has a surface attached to a fatty acid or a salt thereof, and the amount of the fatty acid or salt thereof to the conductive powder is 0.5 wt % or less.

3. A chip electronic component comprising an electronic component device and an external electrode formed on the electronic component device, wherein the external electrode includes a resin electrode which is the cured product of the conductive resin composition according to claim 2.

4. A thermally cured product of a conductive resin composition according to claim 1 in which the conductive powder has a surface coated with at least one triazole compound or imidazole compound.

5. The thermally cured product of a conductive resin composition according to claim 4, wherein the triazole compound is 1-methylbenzotriazole, and the imidazole compound is 2-methylimidazole.

6. A chip electronic component comprising an electronic component device and an external electrode formed on the electronic component device, wherein the external electrode includes a resin electrode which is the cured product of the conductive resin composition according to claim 4.

7. The thermally cured product of a conductive resin composition according to claim 1, wherein the conductive powder is spherical, and the amount of the conductive powder solids in the conductive resin composition is 42 to 54 vol %.

8. A chip electronic component comprising an electronic component device and an external electrode formed on the electronic component device, wherein the external electrode includes a resin electrode which is the cured product of the conductive resin composition according to claim 7.

9. The thermally cured product of a conductive resin composition according to claim 7, wherein the bifunctional epoxy resin is bisphenol A epoxy resin.

10. A chip electronic component comprising an electronic component device and an external electrode formed on the electronic component device, wherein the external electrode includes a resin electrode which is the cured product of the conductive resin composition according to claim 9.

11. The thermally cured product of a conductive resin composition according to claim 1, wherein the solvent is a mixture of two or more solvents, and one solvent has a vapor pressure ≥0.8 mmHg (25° C.) at an amount of 45 wt % or less.

12. A chip electronic component comprising an electronic component device and an external electrode formed on the electronic component device, wherein the external electrode includes a resin electrode which is the cured product of the conductive resin composition according to claim 11.

13. A chip electronic component comprising an electronic component device and an external electrode formed on the electronic component device, wherein the external electrode includes a resin electrode which is the cured product of the conductive resin composition according to claim 1.

14. A thermally curable conductive resin composition comprising:
    a linear bifunctional epoxy resin having a molecular weight of 11000 to 40000 and having a glycidyl group at a molecular end; a conductive powder having a silver surface; and a solvent, wherein
    the composition has a yield value of 3.6 Pa or less,
    the linear bifunctional epoxy resin is of a type that remains in the conductive resin composition after application to a chip electronic component, drying of the conductive resin composition, and thermally curing the conductive resin composition,
    the conductive powder has a surface attached to a fatty acid or a salt thereof, and the amount of the fatty acid or salt thereof to the conductive powder is 0.5 wt % or less, and
    the conductive powder has a surface coated with at least one triazole compound or imidazole compound.

15. The thermally curable conductive resin composition according to claim 14, wherein the triazole compound is 1-methylbenzotriazole.

16. The thermally curable conductive resin composition according to claim 14, wherein the conductive powder is spherical, and the amount of the conductive powder solids in the conductive resin composition is 42 to 54 vol %.

17. The thermally curable conductive resin composition according to claim 16, wherein the bifunctional epoxy resin is bisphenol A epoxy resin.

18. The thermally curable conductive resin composition according to claim 16, wherein the solvent is a mixture of two or more solvents, and one solvent has a vapor pressure ≥0.8 mmHg (25° C.) at an amount of 45 wt % or less.

19. A chip electronic component comprising an electronic component device and an external electrode formed on the electronic component device, wherein the external electrode includes a resin electrode which is a cured conductive resin composition according to claim 14.

20. A thermally curable conductive resin composition comprising:
- a linear bifunctional epoxy resin having a molecular weight of 11000 to 40000 and having a glycidyl group at a molecular end; a conductive powder having a silver surface; and a solvent, wherein
- the composition has a yield value of 3.6 Pa or less,
- the linear bifunctional epoxy resin is of a type that remains in the conductive resin composition after application to a chip electronic component, drying of the conductive resin composition, and thermally curing the conductive resin composition,
- the conductive powder has a surface attached to a fatty acid or a salt thereof, and the amount of the fatty acid or salt thereof to the conductive powder is 0.5 wt % or less, and
- the conductive powder has a surface coated with an imidazole compound and the imidazole compound is 2-methylimidazole.

\* \* \* \* \*